United States Patent Office 3,555,122
Patented Jan. 12, 1971

3,555,122
MIXTURE OF A SUSPENSION RESIN OF VINYL CHLORIDE AND AN ORGANOSOL RESIN OF VINYL CHLORIDE
Charles W. Simons, Bedford, Mass., assignor to W. R. Grace & Co., Cambridge, Mass., a corporation of Connecticut
No Drawing. Filed Mar. 10, 1966, Ser. No. 533,263
Int. Cl. C08f 29/24
U.S. Cl. 260—899                    2 Claims

ABSTRACT OF THE DISCLOSURE

A plastisol composition particularly suited for use in sealing container closures and containing (1) a mixture of a suspension resin of a vinyl chloride polymer and an organosol resin of a vinyl chloride polymer and (2) a liquid non-volatile plasticizer for the resin mixture (e.g. dioctyl phthalate). The organosol resin is present in an amount between about 5 and 30% by weight of the resin mixture.

---

This invention relates to plastisol compositions, and in particular, it relates to plastisol compositions having a resin component containing a very substantial proportion of coarse resin.

Plastisol compositions have been used in the preparation of films and coatings, rainwear, printing plates, closure gaskets for hermetically sealing glass containers and in the manufacture of a wide variety of other products. Conventionally, plastisol compositions are defined as dispersions of finely divided thermoplastic resin particles in a liquid, non-volatile plasticizer in which the resin is insoluble at room temperature. However, at elevated temperatures the resin particles are substantially completely solvated by the plasticizer so that a homogeneous solution is obtained which is transformed into a rubbery, thermoplastic gel upon cooling.

In preparing plastisols, it is customary to use resins, such as vinyl chloride polymer resins, which have been prepared specifically for this purpose by aqueous emulsion polymerization followed by spray drying. These resins are characterized by excellent "stir-in" properties so that they can be readily dispersed in a liquid plasticizer at room temperature to form a paste-like mixture. The plastisol grade resins conventionally employed are high molecular weight homopolymers of vinyl chloride and copolymers of vinyl chloride with up to about 20% by weight and preferably, less than 5% by weight of vinyl acetate or other copolymerizable monomer. Typically, these resins have an inherent viscosity above about 1.10 and a particle size in the range of about 0.1 to 4.0 microns with the average number particle diameter ranging between about 0.2 and 2.0 microns.

Due to their method of manufacture, plastisol grade resins contain relatively large amounts of water-extractable soaps. For this reason, suspension grade resins which are essentially free from soap have been used in admixture with plastisol grade resins in applications where the presence of large amounts of water-extractable soap is undesirable. By suspension resin is meant vinyl resins, such as vinyl chloride polymer resins, produced by suspension polymerization techniques known to the art. The suspension resins, like the plastisol resins, may be homopolymers of vinyl chloride or copolymers of vinyl chloride but in comparison to plastisol resins have a considerably larger particle size and vary more widely in molecular weight from relatively low to relatively high molecular weight. Also, suspension resins do not posses the stir-in characteristics found in plastisol grade resins.

One application where blends of suspension and plastisol grade resins have been used is in the manufacture of fluxed plastisol sealing gaskets for container closures. Because the soaps present in plastisol resins are readily extracted from the gaskets and because the extracted soaps tend to impart and off-flavor to the food pack, a suspension resin is substituted for part of the plastisol resin to improve the taste characteristics of the gasket. While some taste improvement is obtained, any further improvement is limited by the proportion of suspension resin which can be employed to give a still usable composition after normal storage times. Because the suspension resin is coarse, it settles out of dispersion within a few hours, and upon prolonged standing, the settled resin particles become hard packed and difficult to redisperse. As a result, the quantity of suspension resin ordinarily used in admixture with the plastisol resin is not more than about 35% by weight and is usually less than 30% by weight as based on the combined weight of plastisol and suspension resins.

It is, therefore, an object of the present invention to prepare plastisol compositions wherein settling of the resin component is reduced and any settled resin can be readily redispersed after prolonged standing though the resin component contains a higher proportion of coarse suspension grade resin than previously employed. It is a further object of the present invention to provide plastisol compositions wherein the resin component remains substantially completely suspended over comparatively long periods. These and other objects are accomplished by using certain organosol grade resins rather than plastisol grade resins in admixture with the coarse suspension resin to form the resin component.

More specifically, the present invention provides plastisol compositions comprising (1) a vinyl chloride resin mixture composed of (a) a suspension resin and (b) an organosol resin having an average number particle diameter below about 0.25 micron and an inherent viscosity less than 0.90, and (2) a liquid, non-volatile plasticizer for said resin mixture, said organosol resin being used in an amount of at least about 5% by weight of said resin mixture. In a preferred composition of the present invention, the organosol resin constitutes between about 10 and 30% by weight of the vinyl resin mixture.

The term "organosol grade resin" is used herein to denote vinyl resins having a very fine particle size produced in the same manner as plastisol grade resins, i.e., by aqueous emulsion polymerization techniques as is well-known in the art. These resins, though useful in plastisol compounding, are manufactured in very finely divided form especially for use in fluid dispersions similar to plastisols except that the resin particles are dispersed in a liquid medium containing a volatile diluent in addition to the liquid non-volatile plasticizer for the resin. Such dispersions are commonly referred to as "organosols."

The organosol grade resins used in carrying out the present invention may be homopolymers of vinyl chloride or copolymers of vinyl chloride with about 5% by weight or less of vinyl acetate, acrylonitrile, vinylidene chloride, dialkyl maleate, or other ethylenically unsaturated monomer copolymerizable therewith. However, to obtain the benefits of the present invention, the organosol resin employed should have a relatively low molecular weight such that its inherent viscosity is less than 0.90 and should have an average number particle diameter less than about 0.25 micron. Typical of the organosol grade resins which may be used in formulating the present compositions is "Geon 126," a homopolymer of vinyl chloride having an average number particle diameter of about 0.2 micron and an inherent viscosity of about 0.80.

By the term "inherent viscosity" is meant the ratio of the natural logarithm of the relative viscosity to the concentration of vinyl chloride polymer in cyclohexanone as determined according to the procedure outlined in ASTM D1243-60 Method A. The viscosity values obtained by this method are related to the average molecular size of that portion of the polymer which dissolves in the cyclohexanone solvent. All values for inherent viscosity given herein are based on the above standard test.

Any of the suspension grade resins conventionally used in the art may be employed in the present invention including both homopolymers of vinyl chloride and copolymers of vinyl chloride containing 20% by weight or less of vinyl acetate, chloroethylene or other ethylenically unsaturated monomer copolymerizable therewith. In general, these resins have a particle size in the range of approximately 30 to 300 microns with the average number particle diameter being between about 80 and 180 microns and have an inherent viscosity between about 0.50 and 1.20. Illustrative of suspension grade resins which may be used in preparing the present compositions are homopolymers of vinyl chloride, such as "Geon 101," "Vinylite QYNA," "Marvinol VR-10," "Exon 500," and copolymers of vinyl chloride, such as "Geon 202" (94% vinyl chloride copolymerized with 6% vinylidene chloride), "VC-265" (95% vinyl chloride copolymerized with 5% vinyl acetate), and "Vinylite VYNW" (96% vinyl chloride copolymerized with 4% vinyl acetate).

Among the plasticizers which may be used in preparing the present compositions are dialkyl phthalates, alkyl phthalyl alkyl glycolates, dialkyl esters of alkane dicarboxylic acids, acetyl trialkyl citrates, and trialkyl and triaryl phosphates. Particular plasticizers which may be employed include dioctyl phthalate (di-2-ethylhexyl phthalate), octyl decyl phthalate, ethyl phthalyl ethyl glycolate, butyl phthalyl butyl glycolate, diisobutyl adipate, dibutyl sebacate, acetyl tributyl citrate, trioctyl phosphate and tricresyl phosphate. Other useful plasticizers include alkyl esters of fatty acids, such as octyl stearate; epoxy derivatives, such as epoxidized soybean oil; and polymeric polyester plasticizers, such as, polyethylene glycol adipate. While any of the primary plasticizers may be used alone, mixtures of primary plasticizers may be employed, and also, mixtures of one or more primary plasticizers with one or more secondary plasticizers may be used.

Besides the resin and the plasticizer, the compositions of the present invention may contain other conventional compounding ingredients. Such ingredients include fillers, e.g., whiting, talc, clays, barytes, asbestine; pigments, e.g., carbon blacks, iron oxides, titanium dioxide; and stabilizers, e.g., zinc and calcium stearates, thio-organic tin compounds, cadmium and barium laurates. Other compounding ingredients which may be used are waxes, e.g., stearyl alcohol, polyamide wax, paraffin and microcrystalline waxes; wetting agents, e.g., zinc resinate, polyethylene glycol fatty acid esters; and blowing agents, e.g., azodicarbonamide, dinitrosopentamethylenetetramine, and 3,3' disulphonylhydrazide diphenylsulphone.

To obtain a composition where the settling of coarse resin is considerably reduced and where the settled resin remains soft and readily redispersible, the amount of organosol grade resin used in admixture with the suspension grade resin should be at least 5% by weight of the total resin used. Below 5% by weight organosol resin, the coarse suspension resin which settles becomes hard packed and difficult to redisperse. In a preferred embodiment, the organosol grade resin is used at a level of at least 10% by weight of the resin component so that a plastisol composition substantially free from resin settling is obtained. The maximum quantity of organosol resin used is not critical with respect to preventing settling of coarse resin but depends upon other considerations, such as viscosity. For most applications, the practical maximum limit for organosol resin as based on acceptable viscosity characteristics is about 30% by weight of the resin component. Also, plastisol compositions containing larger amounts of organosol resin tend to gel during normal storage times.

With the exception of the proportion of organosol and suspension resins in the resin component, the total amount of resin and the amount of plasticizer and other ingredients used may vary widely. On the basis of 100 parts by weight resin, the plasticizer may be used in amounts ranging between about 50 and 250 parts by weight, and the filler may vary between about 0 to 150 parts by weight. When stabilizers, waxes, wetting agents and other compounding ingredients are employed they are used in conventional amounts to achieve the properties desired during processing and in the fluxed composition.

The following examples are given to more clearly illustrate the present invention. All quantities given are in parts by weight unless otherwise specified.

EXAMPLES 1-9

Two series of compositions were made to compare the settling characteristics of different resin components dispersed in plasticizer. One series of compositions representing Examples 2-5 contained a resin component composed of a mixture of coarse suspension grade resin and a plastisol grade resin in varying amounts. The other series of compositions representing Examples 6-9 contained a resin component composed of varying amounts of an organosol grade resin in admixture with a coarse suspension resin. Example 1 containing only suspension resin in the resin component served as the control.

The particular ingredients used and their proportions are given in Table I below.

TABLE I

| Ingredients | Example No. (parts by weight) | | | | | | | | |
|---|---|---|---|---|---|---|---|---|---|
| | 1 | 2 | 3 | 4 | 5 | 6 | 7 | 8 | 9 |
| Polyvinyl chloride [1] | 100 | 95 | 90 | 80 | 60 | 95 | 90 | 80 | 60 |
| Polyvinyl chloride [2] | | 5 | 10 | 20 | 40 | | | | |
| Polyvinyl chloride [3] | | | | | | 5 | 10 | 20 | 40 |
| Dioctyl phthalate [4] | 70 | 70 | 70 | 70 | 70 | 70 | 70 | 70 | 70 |

[1] Suspension resin, average number particle size 80$\mu$; inherent viscosity 0.75.
[2] Plastisol resin, average number particle size 0.53$\mu$; inherent viscosity 1.27.
[3] Organosol resin, average number particle size 0.21$\mu$; inherent viscosity 0.80.
[4] Plasticizer.

The particle size of the resins employed was determined by microscopic examination and is given in microns ($\mu$). The inherent viscosity of the resins was determined in cyclohexanone solution according to the standard test described in ASTM D1243-60, Method A.

The composition of Examples 1 to 9 were prepared by adding the resin or resins to the plasticizer with stirring. After uniform dispersions were obtained, the compositions were allowed to stand at room temperature for one month after which time the amount of settling in each composition was observed. The results obtained in terms of amount of settling and the relative hardness and redispersibility of the settled mass are given in Table II below.

TABLE II

| | Example No. | | | | | | | | |
|---|---|---|---|---|---|---|---|---|---|
| | 1 | 2 | 3 | 4 | 5 | 6 | 7 | 8 | 9 |
| Plastisol grade resin (wt. percent total resin) | | 5 | 10 | 20 | 40 | | | | |
| Organosol grade resin (wt. percent total resin) | | | | | | 5 | 10 | 20 | 40 |
| Amount of settling (after 1 month) | Severe | Severe | Severe | Heavy | Moderate | Moderate | Very slight | None | None.[1] |
| 1. Degree of packing and | Hard | Hard | Hard | Moderately hard | Moderately hard | Soft | Soft | | |
| 2. Redisgersibility of settled resin [2] (after 1 month) | N | N | N | N | N | R | R | | |

[1] Gelled after 1 month.
[2] N—Not easily redispersed; R—Easily redispersed.

From the results tabulated above, it is apparent from Examples 6 to 9 that as little as 5% by weight of organosol grade resin in the resin component is effective in reducing the amount of resin settling. At a level of 10% by weight, settling was negligible and at the 20 and 40% levels, there was none. Further, any resin that settled from the dispersion formed a soft mass which could be brought back into dispersion with very little stirring.

In comparison, the compositions of Examples 2 to 5 containing plastisol grade resin showed considerably more settling than Examples 6 to 9 at the 5, 10, 20 and 40% levels, respectively. At 5 and 10% by weight plastisol grade resin, settling was excessive, and the compositions showed no improvement over the control while at 20 and 40% settling still remained substantial. Also, the settled mass in each of the Examples 2 to 5 was hard or moderately hard packed so that the settled resin was difficult to redisperse even with long and careful stirring.

EXAMPLE 10

In a further comparison, a plastisol composition was formulated which was identical to Example 3 above except that the plastisol grade resin used was a copolymer of 95% by weight vinyl chloride and 5% by weight vinyl acetate. Also, this plastisol resin though having a relatively high molecular weight as reflected by its inherent viscosity of about 1.27, had a comparatively fine particle size. The average number particle diameter was about 0.22 microns.

The composition of Example 10 was prepared in the same manner as Examples 1 to 9 by adding the plastisol and suspension resins to the plasticizer and stirring until a homogeneous dispersion was obtained.

After mixing, the composition was allowed to stand at room temperature for one month. At the end of this time, it was observed that heavy settling had occurred and that the settled resin was hard packed and difficult to redisperse.

EXAMPLE 11

Another composition was prepared as described in Examples 1 to 9 above. The ingredients employed and their amounts were as follows:

Ingredients: Parts by weight
Copolymer of 94% vinyl chloride and 6% vinylidene chloride (suspension resin—ave. No. particle size—125μ; inherent viscosity—0.87) 90
Polyvinyl chloride (organosol resin—ave. No. particle size 0.21μ; inherent viscosity 0.80) 10
Dioctyl phthalate (plasticizer) 70

The above composition when observed after standing at room temperature for several months showed only slight settling. Also, the settled resin remained soft and was easily redispersed with very little stirring.

From the above examples and results obtained, it is evident that settling of coarse suspension resins from a plastisol composition can be greatly reduced and eliminated, if desired, by using comparatively small amounts of certain organosol grade resins in admixture with a coarse suspension resin to form the resin component. Specifically, the organosol grade resins which provide these advantages are those which have an average number particle diameter below about 0.25 micron together with an inherent viscosity of less than about 0.90. Besides keeping most of the coarse resin in suspension, any resin that does settle in the presence of the organosol grade resin remains easily redispersible after prolonged standing.

Because the resin component tends to remain evenly dispersed over long periods, very little if any stirring of the plastisol is required at the time of use, and constant or intermittent stirring during application as previously required is unnecessary. Whtn it is desired to prepare thick films and coatings or other thick products, there is no separation or stratification of the resin between the time of application and fluxing so that cured products having a uniform distribution of resin and plasticizer are consistently obtained. Moreover, the compositions of the present invention make the preparation of fluxed products, such as fluxed closure gaskets, containing a negligible amount of extractable soap commercially practical since the compositions remain usable indefinitely despite the exceedingly large proportion of suspension resin.

I claim:
1. A plastisol composition consisting essentially of (1) a vinyl resin mixture composed of (a) a resin of a vinyl chloride polymer having an average number particle diameter between about 80 and 180 microns and an inherent viscosity between about 0.5 and 1.20 and (b) a resin of a vinyl chloride polymer having an average number particle diameter below about 0.25 micron and an inherent viscosity below about 0.90, and (2) a liquid non-volatile plasticizer for said resin mixture, said resin (b) being used in an amount of at least about 5%, up to about 30% by weight of said mixture.

2. A composition according to claim 1 wherein said resin (b) is polyvinyl chloride having an average number particle diameter of about 0.21 micron and an inherent viscosity of about 0.80.

References Cited

UNITED STATES PATENTS 3,305,602   2/1967   Bromstead _____ 260—899
3,329,642   7/1967   Lima et al. _____ 260—899

FOREIGN PATENTS 858,177   1/1961   Great Britain _____ 260—899

MURRAY TILLMAN, Primary Examiner
C. J. SECCURO, Assistant Examiner

U.S. Cl. X.R.
260—31.8, 92.8